(12) United States Patent
Luick

(10) Patent No.: US 8,756,404 B2
(45) Date of Patent: Jun. 17, 2014

(54) CASCADED DELAYED FLOAT/VECTOR EXECUTION PIPELINE

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1939 days.

(21) Appl. No.: 11/609,082

(22) Filed: Dec. 11, 2006

(65) Prior Publication Data

US 2008/0141253 A1 Jun. 12, 2008

(51) Int. Cl.
*G06F 9/30* (2006.01)
*G06F 9/40* (2006.01)
*G06F 15/00* (2006.01)

(52) U.S. Cl.
USPC .......................................... 712/215; 712/214

(58) Field of Classification Search
None
See application file for complete search history.

(56) References Cited

U.S. PATENT DOCUMENTS

| | | | |
|---|---|---|---|
| 4,722,050 A | 1/1988 | Lee et al. | |
| 5,546,557 A | 8/1996 | Allen et al. | |
| 5,652,858 A | 7/1997 | Okada et al. | |
| 5,673,407 A | 9/1997 | Poland et al. | |
| 5,721,864 A | 2/1998 | Chiarot et al. | |
| 5,768,610 A | 6/1998 | Pflum | |
| 5,884,060 A | 3/1999 | Vegesna et al. | |
| 5,922,065 A | 7/1999 | Hull et al. | |
| 6,311,261 B1 | 10/2001 | Chamdani et al. | |
| 6,477,639 B1 | 11/2002 | Krishnan et al. | |
| 7,437,690 B2 | 10/2008 | Baumgartner et al. | |
| 2002/0169942 A1 | 11/2002 | Sugimoto | |
| 2003/0149860 A1 | 8/2003 | Becker | |
| 2004/0015683 A1 | 1/2004 | Emma et al. | |
| 2004/0172522 A1 | 9/2004 | Biswas et al. | |
| 2005/0154867 A1 | 7/2005 | DeWitt, Jr. et al. | |
| 2005/0182917 A1 | 8/2005 | Gilkerson | |
| 2007/0186049 A1 | 8/2007 | Luick | |
| 2007/0186050 A1 | 8/2007 | Luick | |
| 2008/0141252 A1 | 6/2008 | Luick | |
| 2008/0162819 A1 | 7/2008 | Luick | |
| 2008/0162894 A1 | 7/2008 | Luick | |
| 2008/0162907 A1 | 7/2008 | Luick | |
| 2008/0313438 A1 | 12/2008 | Luick | |
| 2009/0210664 A1 | 8/2009 | Luick | |

FOREIGN PATENT DOCUMENTS

| | | | |
|---|---|---|---|
| JP | 4205448 A | 7/1992 | |
| JP | 6168119 A | 6/1994 | |
| JP | 6301537 A | 10/1994 | |
| JP | 7084839 A | 3/1995 | |
| JP | 8212068 A | 8/1996 | |
| JP | 9062573 A | 3/1997 | |

(Continued)

OTHER PUBLICATIONS

Smith et al.; Complexity-Effective Superscalar Processors; 1997; ISCA '97.*

(Continued)

*Primary Examiner* — Corey S Faherty
(74) *Attorney, Agent, or Firm* — Patterson & Sheridan LLP

(57) ABSTRACT

Improved techniques for executing instructions in a pipelined manner that may reduce stalls that occur when executing dependent instructions are provided. Stalls may be reduced by utilizing a cascaded arrangement of pipelines with execution units that are delayed with respect to each other. This cascaded delayed arrangement allows dependent instructions to be issued within a common issue group by scheduling them for execution in different pipelines to execute at different times.

20 Claims, 17 Drawing Sheets

(56) References Cited

FOREIGN PATENT DOCUMENTS

| JP | 10232776 A | 9/1998 |
|---|---|---|
| JP | 2000029701 A | 1/2000 |
| JP | 2000089953 A | 3/2000 |
| JP | 2001134439 A | 5/2001 |

OTHER PUBLICATIONS

Patterson, David A., et al. "Computer Architecture: A Quantitative Approach" Morgan Kaufmann Publishers, Inc. San Francisco, CA. 2nd Edition (1996). pp. 139-150.

Luick, David, et al. Non-Final Office Action for U.S. Appl. No. 11/608,988, dated Feb. 23, 2010.

R. Pyreddy et al., "Evaluating Design Tradeoffs in Dual Speed Pipelines," in Workshop on Complexity-Effective Design held in conjunction with the 28th International Symposium on Computer Architecture, Jun. 30, 2001, Goteborg, Sweden, pp. 1-7.

Wikipedia, "netlist". Jan. 23, 2006. Obtained via www.wikipedia.org.

Office Action History of pending U.S. Appl. No. 12/047,954, dates ranging from Apr. 16, 2009 to Aug. 2, 2010.

Office Action History of pending U.S. Appl. No. 11/347,414, dates ranging from Mar. 17, 2008 to Dec. 11, 2008.

Office Action History of pending U.S. Appl. No. 12/047,791, dates ranging from Jan. 5, 2009 to Jun. 24, 2009.

Office Action History of abandoned U.S. Appl. No. 11/347,412, dates ranging from Mar. 17, 2008 to Dec. 3, 2009.

Office Action History of abandoned U.S. Appl. No. 12/048,066, dates ranging from Feb. 2, 2009 to Dec. 22, 2009.

Office Action History of pending U.S. Appl. No. 11/762,824, dates ranging from Jun. 24, 2009 to Oct. 1, 2010.

Final Office Action of pending U.S. Appl. No. 11/608,988, dated Sep. 16, 2010.

* cited by examiner

CASCADED DELAYED FLOAT/VECTOR EXECUTION PIPELINE

CROSS-REFERENCE TO RELATED APPLICATIONS

This application is related to commonly assigned U.S. application Ser. No. 11/347,414, entitled, "SELF PREFETCHING L2 CACHE MECHANISM FOR DATA LINES, filed Feb. 3, 2006 and U.S. application Ser. No. 11/608,988, filed herewith. These related patent applications are herein incorporated by reference in their entirety.

BACKGROUND OF THE INVENTION

1. Field of the Invention

The present invention generally relates to pipelined processors and, more particularly, to processors utilizing a cascaded arrangement of execution units that are delayed with respect to each other.

2. Description of the Related Art

Computer systems typically contain several integrated circuits (ICs), including one or more processors used to process information in the computer system. Modern processors often process instructions in a pipelined manner, executing each instruction as a series of steps. Each step is typically performed by a different stage (hardware circuit) in the pipeline, with each pipeline stage performing its step on a different instruction in the pipeline in a given clock cycle. As a result, if a pipeline is fully loaded, an instruction is processed each clock cycle, thereby increasing throughput.

As a simple example, a pipeline may include three stages: load (read instruction from memory), execute (execute the instruction), and store (store the results). In a first clock cycle, a first instruction enters the pipeline load stage. In a second clock cycle, the first instruction moves to the execution stage, freeing up the load stage to load a second instruction. In a third clock cycle, the results of executing the first instruction may be stored by the store stage, while the second instruction is executed and a third instruction is loaded.

Unfortunately, due to dependencies inherent in a typical instruction stream, conventional instruction pipelines suffer from stalls (with pipeline stages not executing) while an execution unit to execute one instruction waits for results generated by execution of a previous instruction. As an example, a load instruction may be dependent on a previous instruction (e.g., another load instruction or addition of an offset to a base address) to supply the address of the data to be loaded. As another example, a multiply instruction may rely on the results of one or more previous load instructions for one of its operands. In either case, a conventional instruction pipeline would stall until the results of the previous instruction are available. Stalls can be for several clock cycles, for example, if the previous instruction (on which the subsequent instruction is dependent) targets data that does not reside in an L1 cache (resulting in an L1 "cache miss") and a relatively slow L2 cache must be accessed. As a result, such stalls may result in a substantial reduction in performance due to underutilization of the pipeline.

Accordingly, what is needed is an improved mechanism of pipelining instructions, preferably that reduces stalls.

SUMMARY OF THE INVENTION

Embodiments of the invention provide improved methods and apparatus for pipelined execution of instructions.

One embodiment provides a method of scheduling instructions for execution. The method generally includes receiving a first issue group of instructions including at least first and second instructions, determining if the second instruction in the issue group is dependent on results generated by executing the first instruction, and if so, scheduling the first instruction for execution in a first pipeline and scheduling the second instruction for execution in a second pipeline in which execution is delayed with respect to the first pipeline.

Another embodiment of the invention provides an integrated circuit device. The device generally includes a cascaded delayed execution pipeline unit having at least first and second execution pipelines, wherein instructions in a common issue group issued to the execution pipeline unit are executed in the first execution pipeline before the second execution pipeline.

Another embodiment of the invention provides an integrated circuit device generally including a cascaded delayed execution pipeline unit and scheduling circuitry. The cascaded delayed execution pipeline unit has at least first and second execution pipelines, wherein instructions in a common issue group issued to the execution pipeline unit are executed in the first execution pipeline before the second execution pipeline. The scheduling circuitry is configured to receive a first issue group of instructions including at least first and second instructions, determine if the second instruction in the issue group is dependent on results generated by executing the first instruction and, if so, schedule the first instruction for execution in the first execution pipeline and schedule the second instruction for execution in the second execution pipeline.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
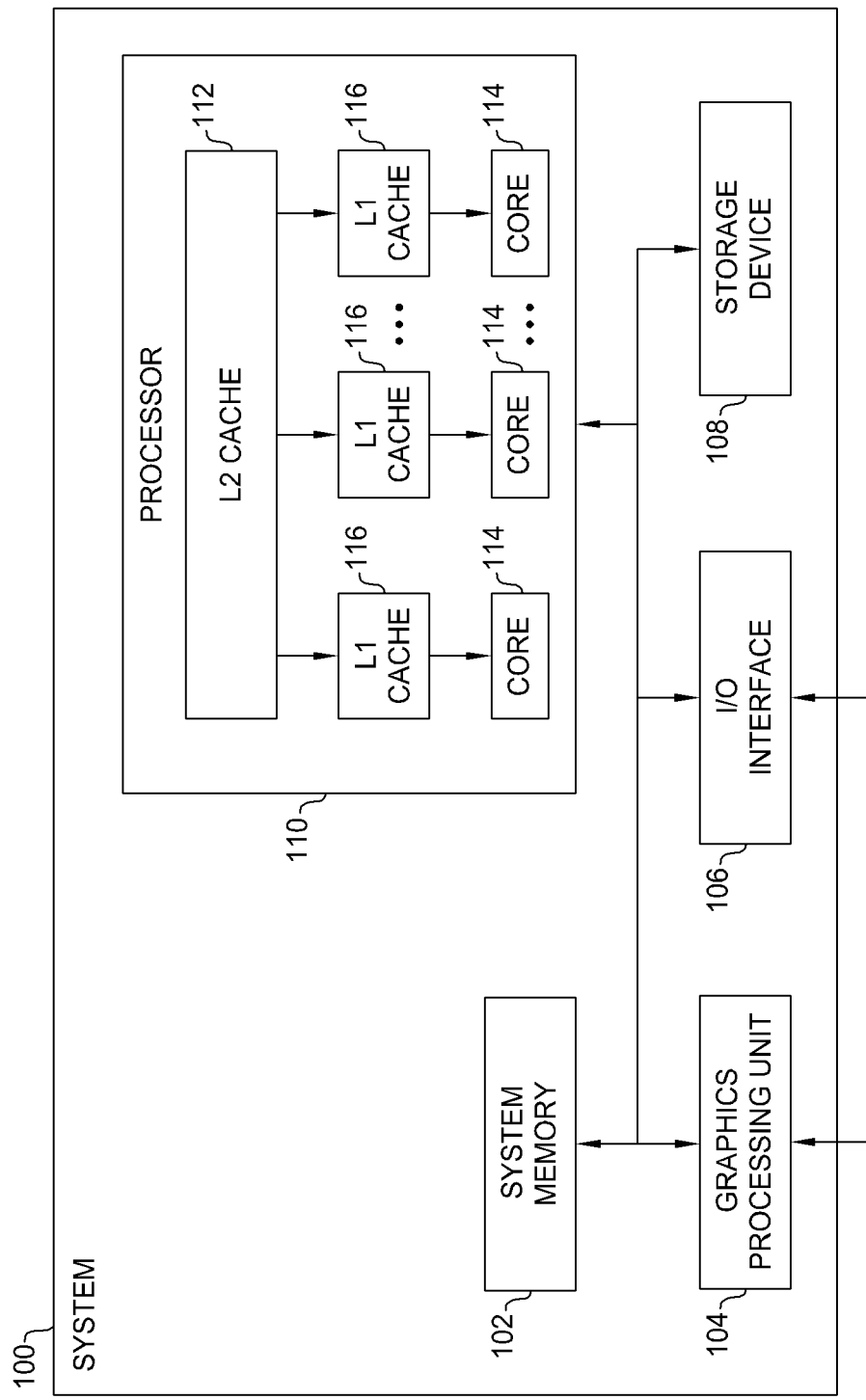
FIG. 1 is a block diagram depicting a system according to one embodiment of the invention.

The present invention generally provides an improved technique for executing instructions in a pipelined manner that may reduce stalls that occur when executing dependent instructions. Stalls may be reduced by utilizing a cascaded arrangement of pipelines with execution units that are delayed with respect to each other. This cascaded delayed arrangement allows dependent instructions to be issued within a common issue group by scheduling them for execution in different pipelines to execute at different times.

As an example, a first instructions may be scheduled to execute on a first "earlier" or "less-delayed" pipeline, while a second instruction (dependent on the results obtained by executing the first instruction) may be scheduled to execute on a second "later" or "more-delayed" pipeline. By scheduling the second instruction to execute in a pipeline that is delayed relative to the first pipeline, the results of the first instruction may be available just in time when the second instruction is to execute. While execution of the second instruction is still delayed until the results of the first instruction are available, subsequent issue groups may enter the cascaded pipeline on the next cycle, thereby increasing throughput. In other words, such delay is only "seen" on a first issue group and is "hidden" for subsequent issue groups, allowing a different issue group (even with dependent instructions) to be issued each pipeline cycle.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

OVERVIEW OF AN EXEMPLARY SYSTEM

FIG. 1 is a block diagram depicting a system 100 according to one embodiment of the invention. The system 100 may contain a system memory 102 for storing instructions and data, a graphics processing unit 104 for graphics processing, an I/O interface for communicating with external devices, a storage device 108 for long term storage of instructions and data, and a processor 110 for processing instructions and data.

According to one embodiment of the invention, the processor 110 may have an L2 cache 112 as well as multiple L1 caches 116, with each L1 cache 116 being utilized by one of multiple processor cores 114. According to one embodiment, each processor core 114 may be pipelined, wherein each instruction is performed in a series of small steps with each step being performed by a different pipeline stage.

Figure 2:
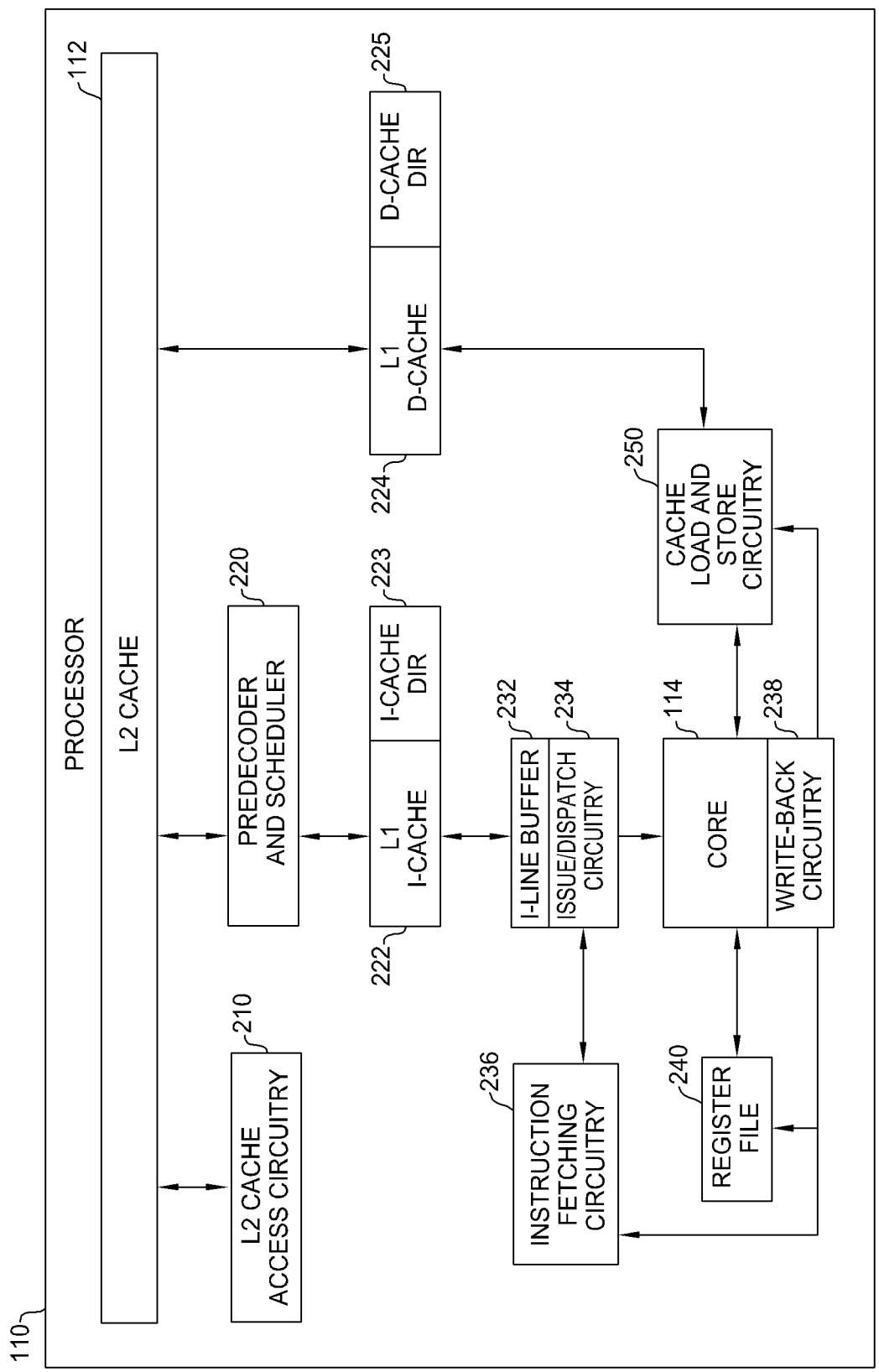
FIG. 2 is a block diagram depicting a computer processor according to one embodiment of the invention.

FIG. 2 is a block diagram depicting a processor 110 according to one embodiment of the invention. For simplicity, FIG. 2 depicts and is described with respect to a single core 114 of the processor 110. In one embodiment, each core 114 may be identical (e.g., containing identical pipelines with the same arrangement of pipeline stages). For other embodiments, cores 114 may be different (e.g., containing different pipelines with different arrangements of pipeline stages).

In one embodiment of the invention, the L2 cache may contain a portion of the instructions and data being used by the processor 110. In some cases, the processor 110 may request instructions and data which are not contained in the L2 cache 112. Where requested instructions and data are not contained in the L2 cache 112, the requested instructions and data may be retrieved (either from a higher level cache or system memory 102) and placed in the L2 cache. When the processor core 114 requests instructions from the L2 cache 112, the instructions may be first processed by a predecoder and scheduler 220.

In one embodiment of the invention, instructions may be fetched from the L2 cache 112 in groups, referred to as I-lines. Similarly, data may be fetched from the L2 cache 112 in groups referred to as D-lines. The L1 cache 116 depicted in FIG. 1 may be divided into two parts, an L1 instruction cache 222 (I-cache 222) for storing I-lines as well as an L1 data cache 224 (D-cache 224) for storing D-lines. I-lines and D-lines may be fetched from the L2 cache 112 using L2 access circuitry 210.

In one embodiment of the invention, I-lines retrieved from the L2 cache 112 may be processed by a predecoder and scheduler 220 and the I-lines may be placed in the I-cache 222. To further improve processor performance, instructions are often predecoded, for example, I-lines are retrieved from L2 (or higher) cache. Such predecoding may include various functions, such as address generation, branch prediction, and scheduling (determining an order in which the instructions should be issued), which is captured as dispatch information (a set of flags) that control instruction execution. For some embodiments, the predecoder (and scheduler) 220 may be shared among multiple cores 114 and L1 caches.

In addition to receiving instructions from the issue and dispatch circuitry 234, the core 114 may receive data from a variety of locations. Where the core 114 requires data from a data register, a register file 240 may be used to obtain data.

Where the core 114 requires data from a memory location, cache load and store circuitry 250 may be used to load data from the D-cache 224. Where such a load is performed, a request for the required data may be issued to the D-cache 224. At the same time, the D-cache directory 225 may be checked to determine whether the desired data is located in the D-cache 224. Where the D-cache 224 contains the desired data, the D-cache directory 225 may indicate that the D-cache 224 contains the desired data and the D-cache access may be completed at some time afterwards. Where the D-cache 224 does not contain the desired data, the D-cache directory 225 may indicate that the D-cache 224 does not contain the desired data. Because the D-cache directory 225 may be accessed more quickly than the D-cache 224, a request for the desired data may be issued to the L2 cache 112 (e.g., using the L2 access circuitry 210) after the D-cache directory 225 is accessed but before the D-cache access is completed.

In some cases, data may be modified in the core 114. Modified data may be written to the register file, or stored in memory. Write back circuitry 238 may be used to write data back to the register file 240. In some cases, the write back circuitry 238 may utilize the cache load and store circuitry 250 to write data back to the D-cache 224. Optionally, the core 114 may access the cache load and store circuitry 250 directly to perform stores. In some cases, as described below, the write-back circuitry 238 may also be used to write instructions back to the I-cache 222.

As described above, the issue and dispatch circuitry 234 may be used to form instruction groups and issue the formed instruction groups to the core 114. The issue and dispatch circuitry 234 may also include circuitry to rotate and merge instructions in the I-line and thereby form an appropriate instruction group. Formation of issue groups may take into account several considerations, such as dependencies between the instructions in an issue group as well as optimizations which may be achieved from the ordering of instructions as described in greater detail below. Once an issue group is formed, the issue group may be dispatched in parallel to the processor core 114. In some cases, an instruction group may contain one instruction for each pipeline in the core 114. Optionally, the instruction group may a smaller number of instructions.

Cascaded Delayed Execution Pipeline

Figure 3:
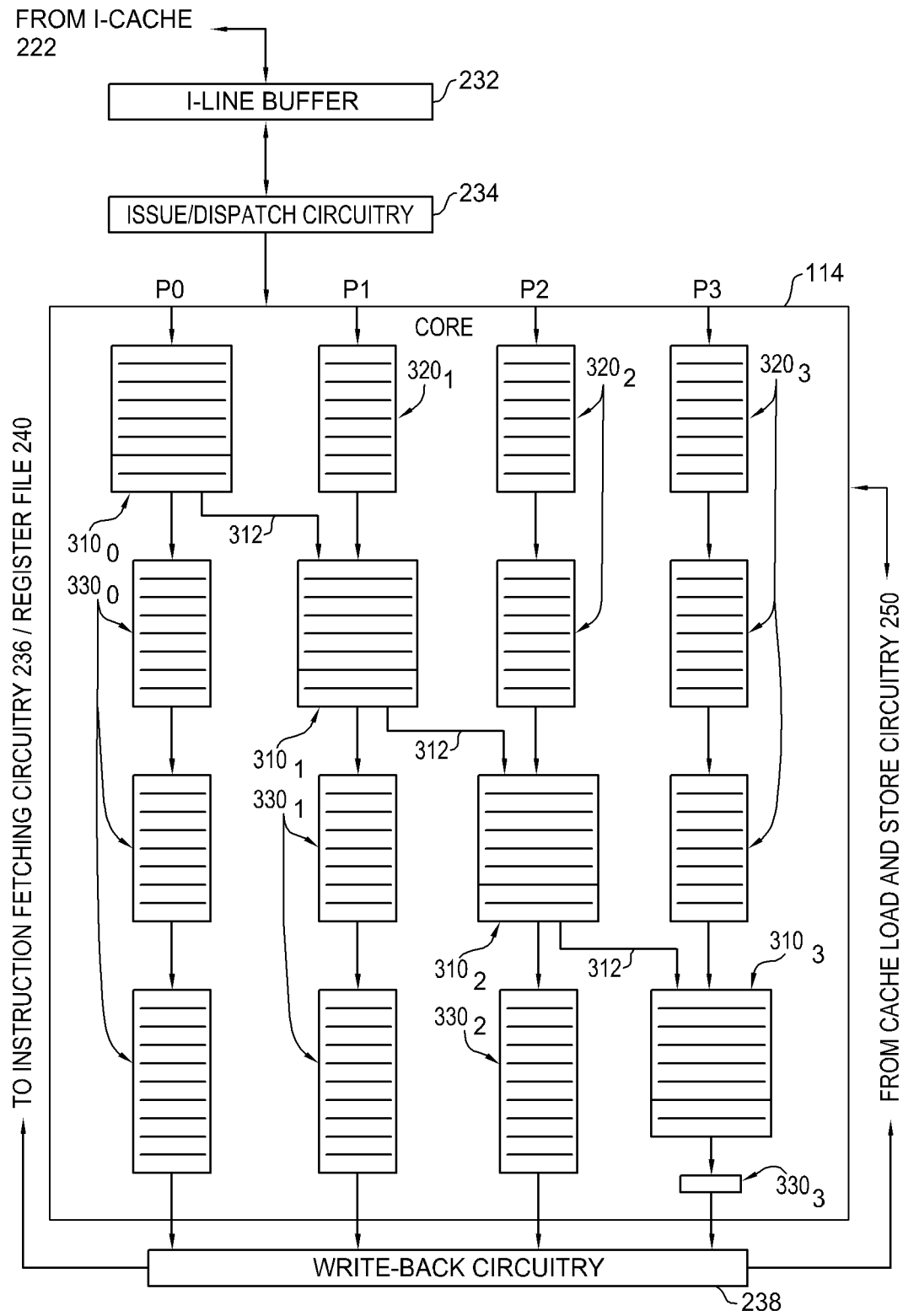
FIG. 3 is a block diagram depicting one of the cores of the processor according to one embodiment of the invention.

According to one embodiment of the invention, one or more processor cores 114 may utilize a cascaded, delayed execution pipeline configuration. In the example depicted in FIG. 3, the core 114 contains four pipelines in a cascaded configuration. Optionally, a smaller number (two or more pipelines) or a larger number (more than four pipelines) may be used in such a configuration. Furthermore, the physical layout of the pipeline depicted in FIG. 3 is exemplary, and not necessarily suggestive of an actual physical layout of the cascaded, delayed execution pipeline unit.

In one embodiment, each pipeline (P0, P1, P2, P3) in the cascaded, delayed execution pipeline configuration may contain an execution unit 310. The execution unit 310 may contain several pipeline stages which perform one or more functions for a given pipeline. For example, the execution unit 310 may perform all or a portion of the fetching and decoding of an instruction. The decoding performed by the execution unit may be shared with a predecoder and scheduler 220 which is shared among multiple cores 114 or, optionally, which is utilized by a single core 114. The execution unit may also read data from a register file, calculate addresses, perform integer arithmetic functions (e.g., using an arithmetic logic unit, or ALU), perform floating point arithmetic functions, execute instruction branches, perform data access functions (e.g., loads and stores from memory), and store data back to registers (e.g., in the register file 240). In some cases, the core 114 may utilize instruction fetching circuitry 236, the register file 240, cache load and store circuitry 250, and write-back circuitry, as well as any other circuitry, to perform these functions.

In one embodiment, each execution unit 310 may perform the same functions. Optionally, each execution unit 310 (or different groups of execution units) may perform different sets of functions. Also, in some cases the execution units 310 in each core 114 may be the same or different from execution units 310 provided in other cores. For example, in one core, execution units $310_0$ and $310_2$ may perform load/store and arithmetic functions while execution units $310_1$ and $310_2$ may perform only arithmetic functions.

In one embodiment, as depicted, execution in the execution units 310 may be performed in a delayed manner with respect to the other execution units 310. The depicted arrangement may also be referred to as a cascaded, delayed configuration, but the depicted layout is not necessarily indicative of an actual physical layout of the execution units. Instructions in a common issue group (e.g., instructions I0, I1, I2, and I3) may be issued in parallel to the pipelines P0, P1, P2, P3, with each instruction may be executed in a delayed fashion with respect to each other instruction. For example, instruction I0 may be executed first in the execution unit $310_0$ for pipeline P0, instruction I1 may be executed second in the execution unit $310_1$ for pipeline P1, and so on.

In such a configuration, where instructions in a group executed in parallel are not required to issue in program order (e.g., if no dependencies exist between instructions they may be issued to any pipe) all instruction groups are assumed to be executed in order for the previous examples. However, out of order execution across groups is also allowable for other exemplary embodiments. In out of order execution, the cascade delayed arrangement may still provide similar advantages. However, in some cases, it may be decided that one instruction from a previous group may not be executed with that group. As an example, a first group may have three loads (in program order: L1, L2, and L3), with L3 dependent on L1, and L2 not dependent on either. In this example, L1 and L3 may be issued in a common group (with L3 issued to a more delayed pipeline), while L2 may be issued "out of order" in a subsequent issue group.

In one embodiment, upon issuing the issue group to the processor core 114, I0 may be executed immediately in execution unit $310_0$. Later, after instruction I0 has finished being executed in execution unit $310_0$, execution unit $310_1$ may begin executing instruction I1, and so on, such that the instructions issued in parallel to the core 114 are executed in a delayed manner with respect to each other.

In one embodiment, some execution units 310 may be delayed with respect to each other while other execution units 310 are not delayed with respect to each other. Where execution of a second instruction is dependent on the execution of a first instruction, forwarding paths 312 may be used to forward the result from the first instruction to the second instruction. The depicted forwarding paths 312 are merely exemplary, and the core 114 may contain more forwarding paths from different points in an execution unit 310 to other execution units 310 or to the same execution unit 310.

In one embodiment, instructions which are not being executed by an execution unit 310 (e.g., instructions being delayed) may be held in a delay queue 320 or a target delay queue 330. The delay queues 320 may be used to hold instructions in an instruction group which have not yet been executed by an execution unit 310. For example, while instruction 10 is being executed in execution unit $310_0$, instructions I1, I2, and I3 may be held in a delay queue 320. Once the instructions have moved through the delay queues 320, the instructions may be issued to the appropriate execution unit 310 and executed. The target delay queues 330 may be used to hold the results of instructions which have already been executed by an execution unit 310. In some cases, results in the target delay queues 330 may be forwarded to executions units 310 for processing or invalidated where appropriate. Similarly, in some circumstances, instructions in the delay queue 320 may be invalidated, as described below.

In one embodiment, after each of the instructions in an instruction group have passed through the delay queues 320, execution units 310, and target delay queues 330, the results (e.g., data, and, as described below, instructions) may be written back either to the register file or the L1 I-cache 222 and/or D-cache 224. In some cases, the write-back circuitry 238 may be used to write back the most recently modified value of a register (received from one of the target delay queues 330) and discard invalidated results.

Performance of Cascaded Delayed Execution Pipelines

Figure 4A:
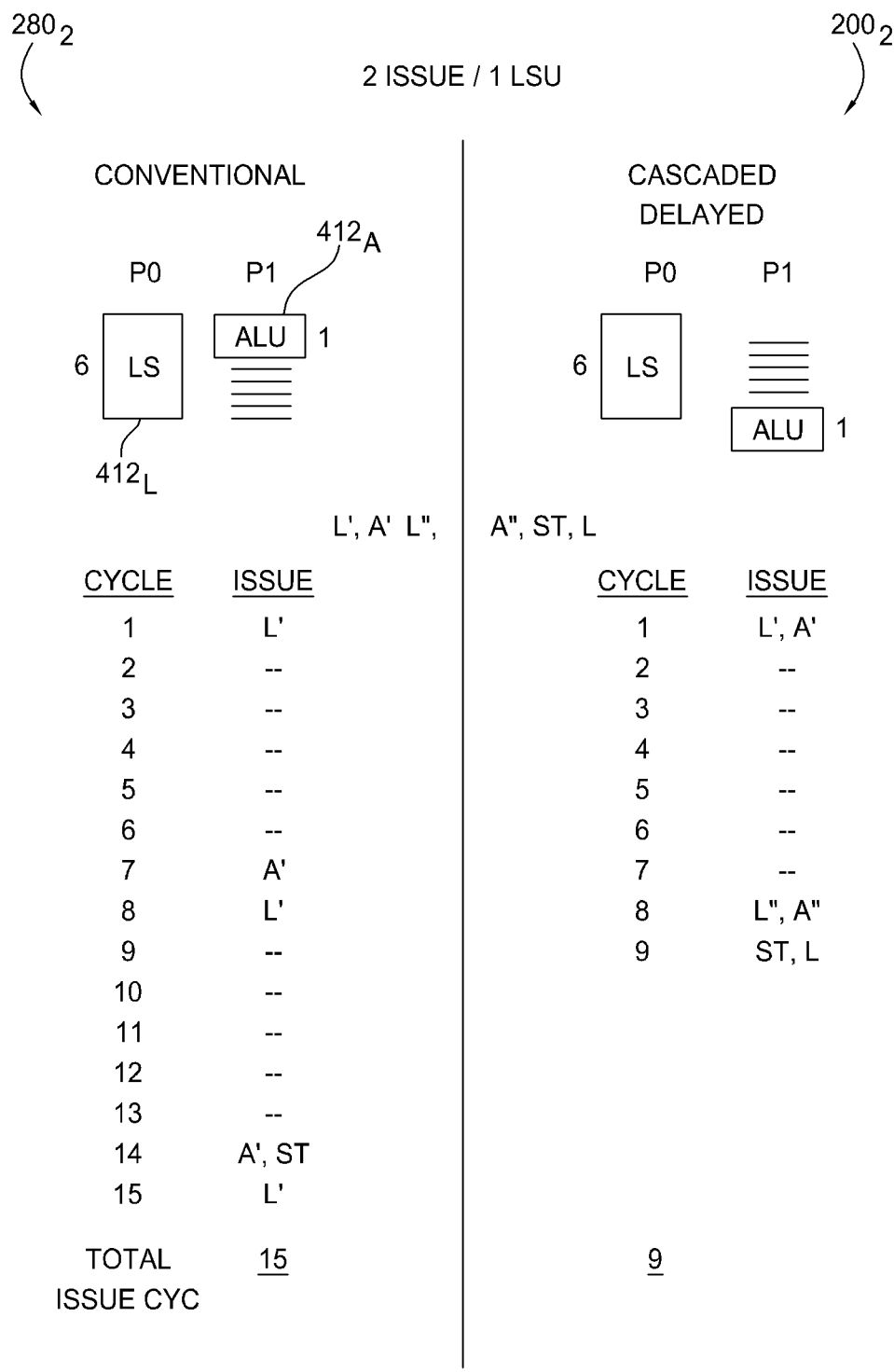
FIGS. 4A and 4B compare the performance of conventional pipeline units to pipeline units in accordance with embodiments of the present invention.
Figure 4B:
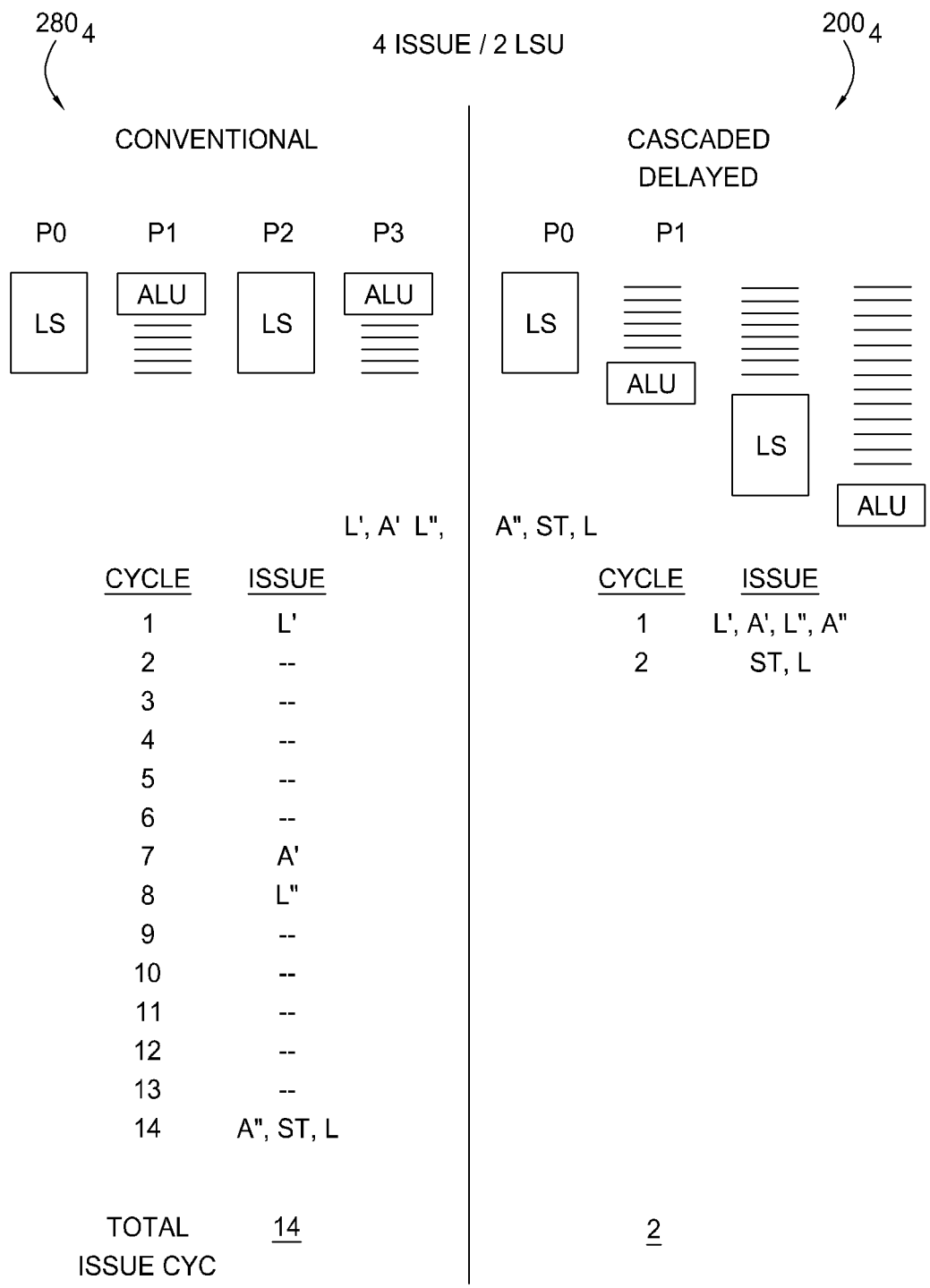

The performance impact of cascaded delayed execution pipelines may be illustrated by way of comparisons with conventional in-order execution pipelines, as shown in FIGS. 4A and 4B. In FIG. 4A, the performance of a conventional "2 issue" pipeline arrangement $280_2$ is compared with a cascaded-delayed pipeline arrangement $200_2$, in accordance with embodiments of the present invention. In FIG. 4B, the performance of a conventional "4 issue" pipeline arrangement $280_4$ is compared with a cascaded-delayed pipeline arrangement $200_4$, in accordance with embodiments of the present invention.

For illustrative purposes only, relatively simple arrangements including only load store units (LSUs) 412 and arithmetic logic units (ALUs) 414 are shown. However, those skilled in the art will appreciate that similar improvements in performance may be gained using cascaded delayed arrangements of various other types of execution units. Further, the performance of each arrangement will be discussed with respect to execution of an exemplary instruction issue group (L'-A'-L"-A"-ST-L) that includes two dependent load-add instruction pairs (L'-A' and L"-A"), an independent store instruction (ST), and an independent load instruction (L). In this example, not only is each add dependent on the previous load, but the second load (L") is dependent on the results of the first add (A').

Referring first to the conventional 2-issue pipeline arrangement $280_2$ shown in FIG. 4A, the first load (L') is issued in the first cycle. Because the first add (A') is dependent on the results of the first load, the first add cannot issue until the results are available, at cycle 7 in this example. Assuming the first add completes in one cycle, the second load (L"), dependent on its results, can issue in the next cycle. Again, the second add (A") cannot issue until the results of the second load are available, at cycle 14 in this example. Because the store instruction is independent, it may issue in the same cycle. Further, because the third load instruction (L) is independent, it may issue in the next cycle (cycle 15), for a total of 15 issue cycles.

Referring next to the 2-issue delayed execution pipeline $200_2$ shown in FIG. 4A, the total number of issue cycles may be significantly reduced. As illustrated, due to the delayed arrangement, with an arithmetic logic unit (ALU) $412_A$ of the second pipeline (P1) located deep in the pipeline relative to a load store unit (LSU) $412_L$ of the first pipeline (P0), both the first load and add instructions (L'-A') may be issued together, despite the dependency. In other words, by the time A' reaches ALU $412_A$, the results of the L' may be available and forwarded for use in execution of A', at cycle 7. Again assuming A' completes in one cycle, L" and A" can issue in the next cycle. Because the following store and load instructions are independent, they may issue in the next cycle. Thus, even without increasing the issue width, a cascaded delayed execution pipeline $200_2$ reduces the total number of issue cycles to 9.

Referring next to the conventional 4-issue pipeline arrangement $280_4$ shown in FIG. 4B, it can be seen that, despite the increase (×2) in issue width, the first add (A') still cannot issue until the results of the first load (L') are available, at cycle 7. After the results of the second load (L") are available, however, the increase in issue width does allow the second add (A") and the independent store and load instructions (ST and L) to be issued in the same cycle. However, this results in only marginal performance increase, reducing the total number of issue cycles to 14.

Referring next to the 4-issue cascaded delayed execution pipeline $200_4$ shown in FIG. 4B, the total number of issue cycles may be significantly reduced when combining a wider issue group with a cascaded delayed arrangement. As illustrated, due to the delayed arrangement, with a second arithmetic logic unit (ALU) $412_A$ of the fourth pipeline (P3) located deep in the pipeline relative to a second load store unit (LSU) $412_L$ of the third pipeline (P2), both load add pairs (L'-A' and L"-A") may be issued together, despite the dependency. In other words, by the time L" reaches LSU $412_L$ of the third pipeline (P2), the results of A' will be available and by the time A' reaches ALU $412_A$ of the fourth pipeline (P3), the results of A" will be available. As a result, the subsequent store and load instructions may issue in the next cycle, reducing the total number of issue cycles to 2.

Scheduling Instructions in an issue Group

Figure 5:
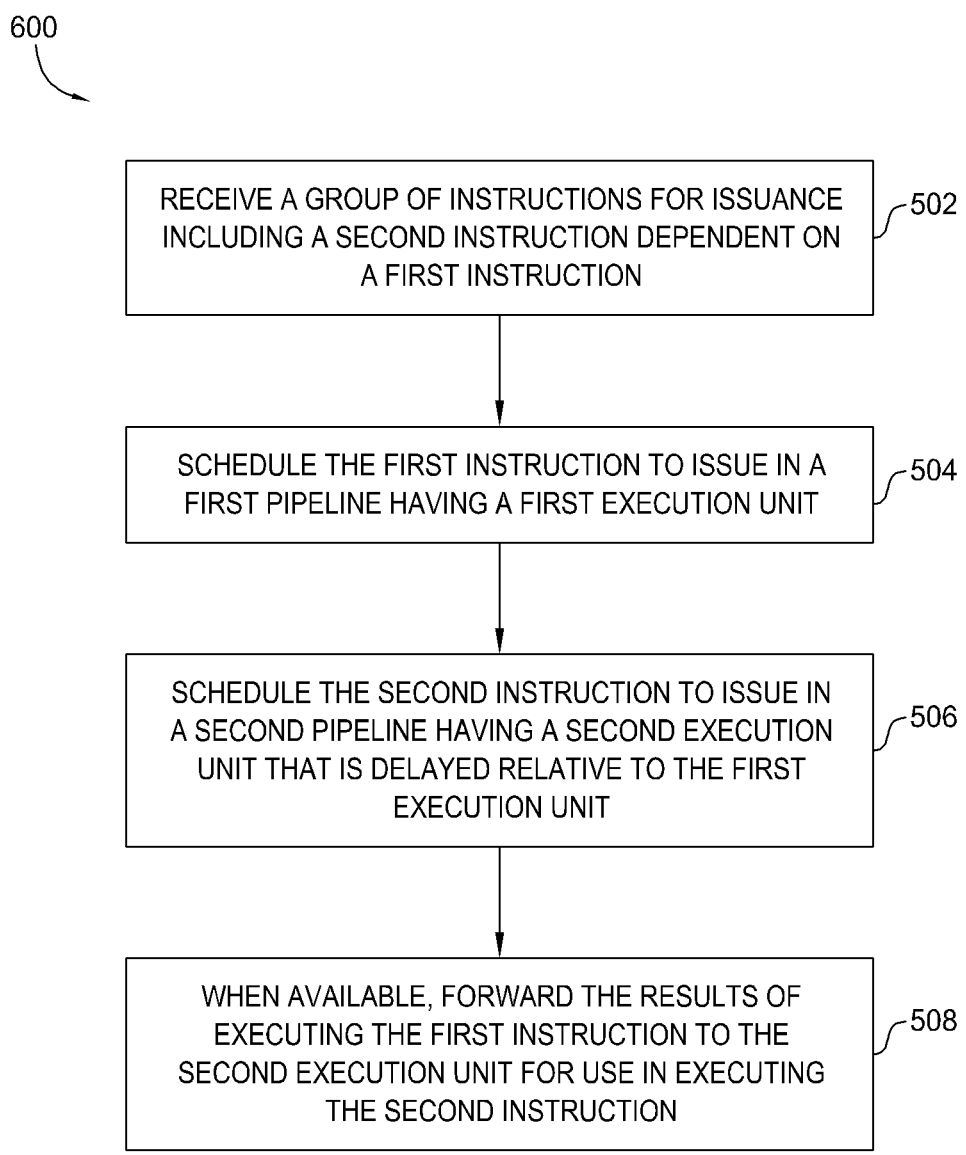
FIG. 5 illustrates an exemplary integer cascaded delayed execution pipeline unit in accordance with embodiments of the present invention.

FIG. 5 illustrates exemplary operations 500 for scheduling and issuing instructions with at least some dependencies for execution in a cascaded-delayed execution pipeline. For some embodiments, the actual scheduling operations may be performed in a predecoder/scheduler circuit shared between multiple processor cores (each having a cascaded-delayed execution pipeline unit), while dispatching/issuing instructions may be performed by separate circuitry within a processor core. As an example, a shared predecoder/scheduler may apply a set of scheduling rules by examining a "window" of instructions to issue to check for dependencies and generate a set of "issue flags" that control how (to which pipelines) dispatch circuitry will issue instructions within a group.

In any case, at step 502, a group of instructions to be issued is received, with the group including a second instruction dependent on a first instruction. At step 504, the first instruction is scheduled to issue in a first pipeline having a first execution unit. At step 506, the second instruction is scheduled to issue in a second pipeline having a second execution unit that is delayed relative to the first execution unit. At step 508 (during execution), the results of executing the first instruction are forwarded to the second execution unit for use in executing the second instruction.

The exact manner in which instructions are scheduled to different pipelines may vary with different embodiments and may depend, at least in part, on the exact configuration of the corresponding cascaded-delayed pipeline unit. As an example, a wider issue pipeline unit may allow more instructions to be issued in parallel and offer more choices for scheduling, while a deeper pipeline unit may allow more dependent instructions to be issued together.

Of course, the overall increase in performance gained by utilizing a cascaded-delayed pipeline arrangement will depend on a number of factors. As an example, wider issue width (more pipelines) cascaded arrangements may allow larger issue groups and, in general, more dependent instructions to be issued together. Due to practical limitations, such as power or space costs, however, it may be desirable to limit the issue width of a pipeline unit to a manageable number. For some embodiments, a cascaded arrangement of 4-6 pipelines may provide good performance at an acceptable cost. The overall width may also depend on the type of instructions that are anticipated, which will likely determine the particular execution units in the arrangement.

An Example Embodiment of an Integer Cascaded Delayed Execution Pipeline

Figure 6:
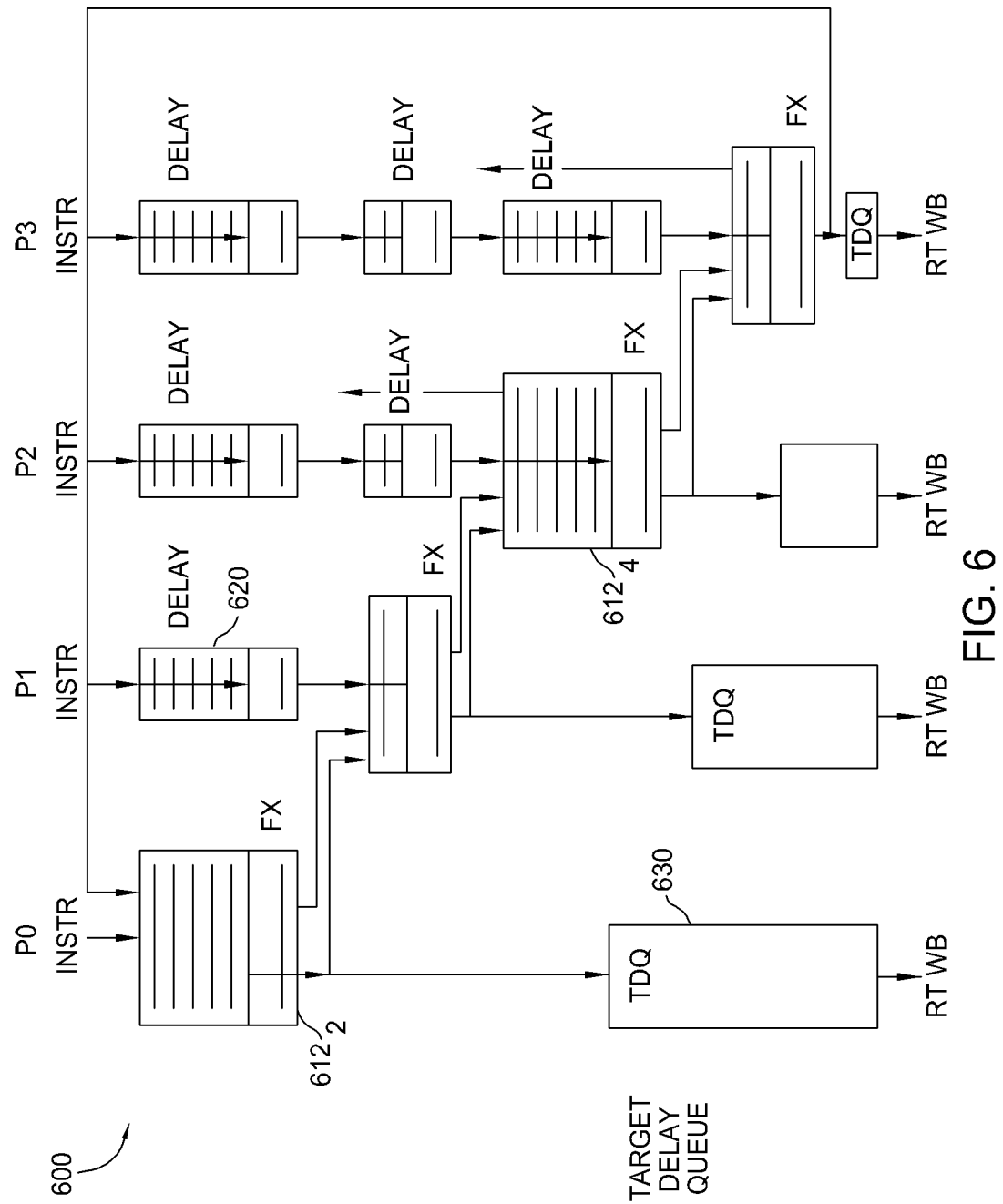
FIG. 6 is a flow diagram of exemplary operations for scheduling and issuing instructions in accordance with embodiments of the present invention.

FIG. 6 illustrates an exemplary arrangement of a cascaded-delayed execution pipeline unit 600 for executing integer instructions. As illustrated, the unit has four execution units, including two LSUs $612_L$ and two ALUs $614_A$. The unit 600 allows direct forwarding of results between adjacent pipelines. For some embodiments, more complex forwarding may be allowed, for example, with direct forwarding between non-adjacent pipelines. For some embodiments, selective forwarding from the target delay queues (TDQs) 630 may also be permitted.

FIGS. 7A-7D illustrate the flow of an exemplary issue group of four instructions (L'-A'-L'-A") through the pipeline unit 600 shown in FIG. 6. As illustrated, in FIG. 7A, the issue group may enter the unit 600, with the first load instruction (L') scheduled to the least delayed first pipeline (P0). As a result, L' will reach the first LSU 612L to be executed before the other instructions in the group (these other instructions may make there way down through instruction queues 620) as L' is being executed.

Figure 7A:
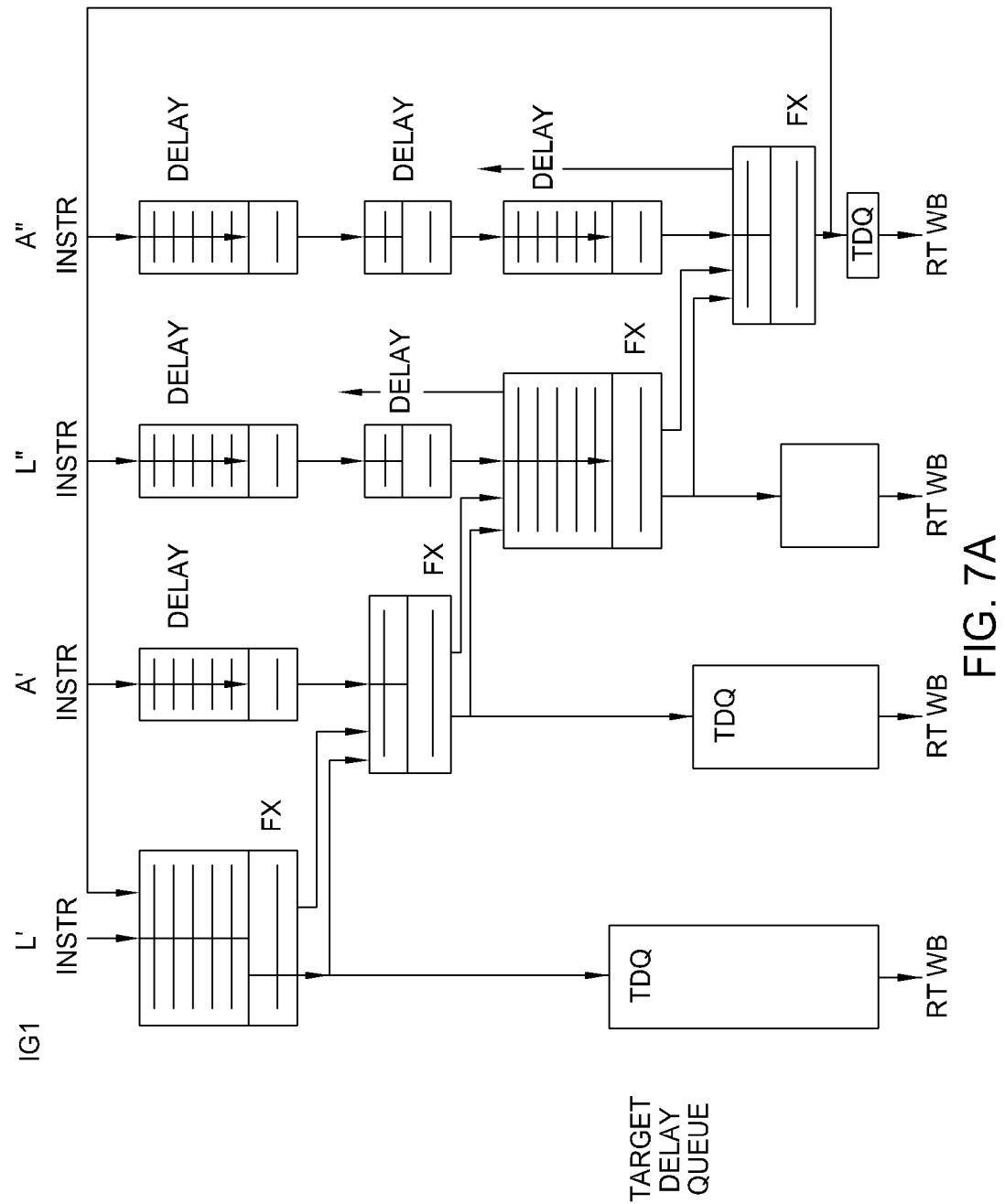
FIGS. 7A-7C illustrate the flow of instructions through the pipeline unit shown in FIG. 5.
Figure 7B:
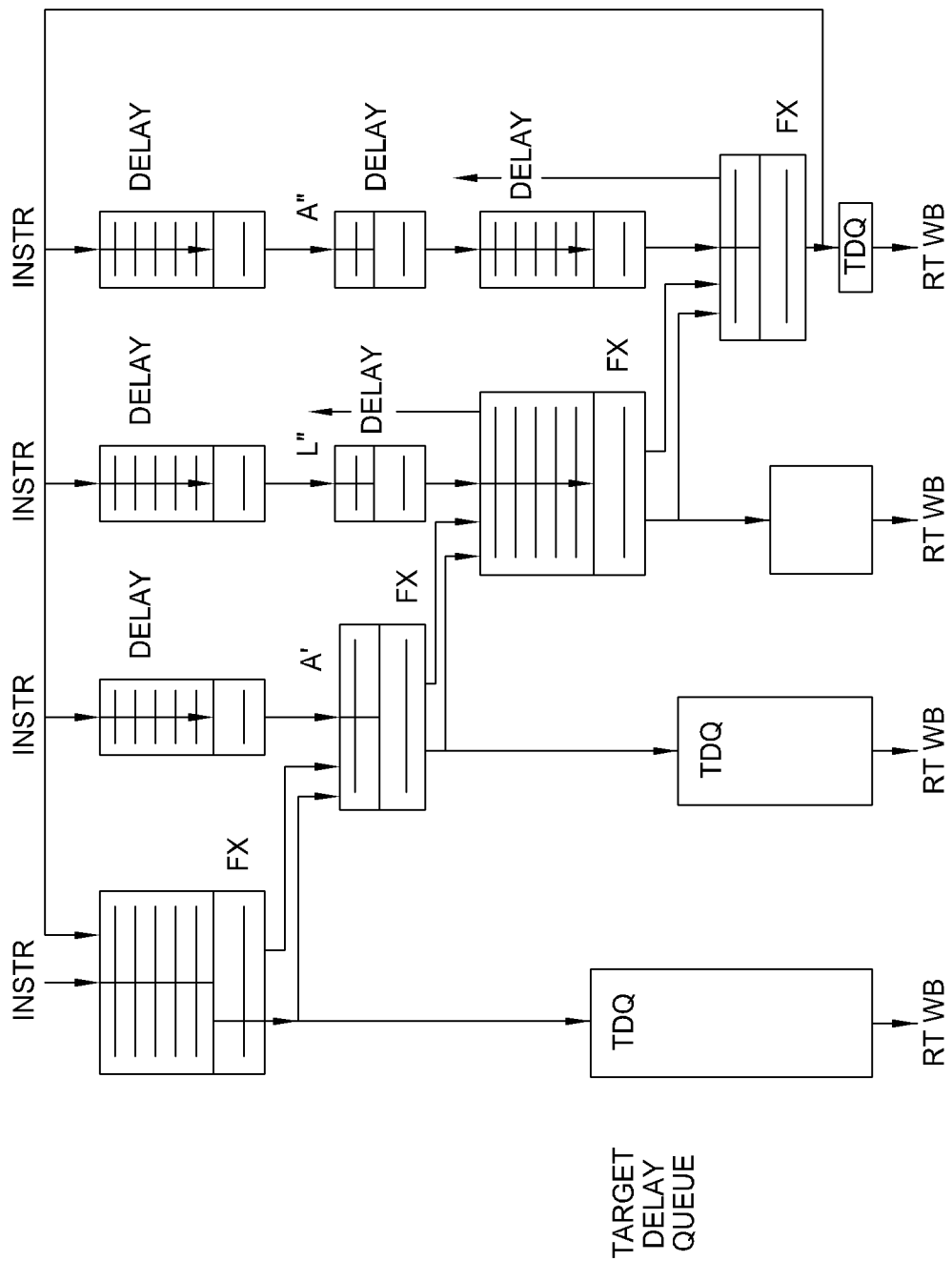

As illustrated in FIG. 7B, the results of executing the first load (L') may be available (just in time) as the first add A' reaches the first ALU 612A of the second pipeline (P1). In some cases, the second load may be dependent on the results of the first add instruction, for example, which may calculate by adding an offset (e.g., loaded with the first load L') to a base address (e.g., an operand of the first add A').

Figure 7C:
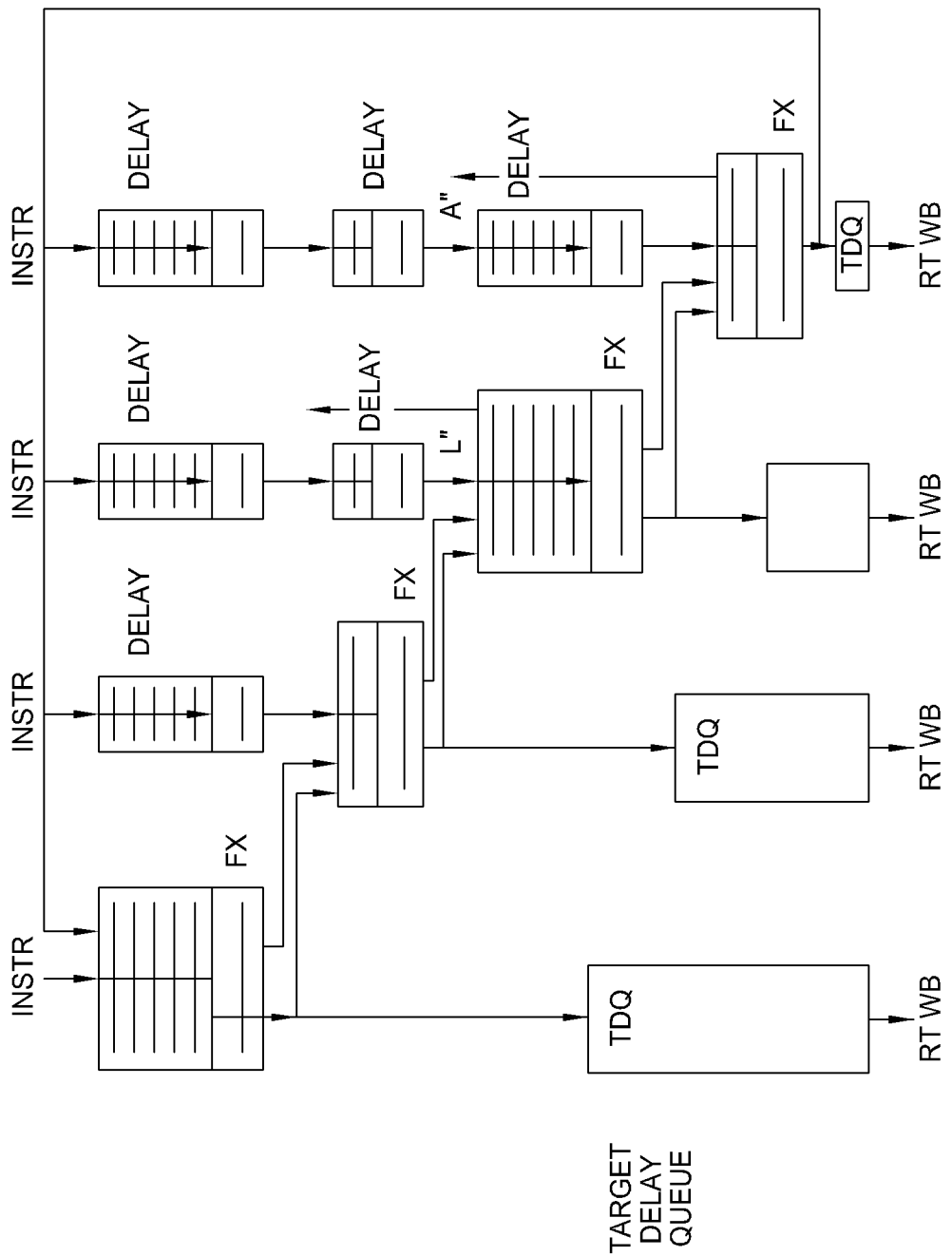
Figure 7D:
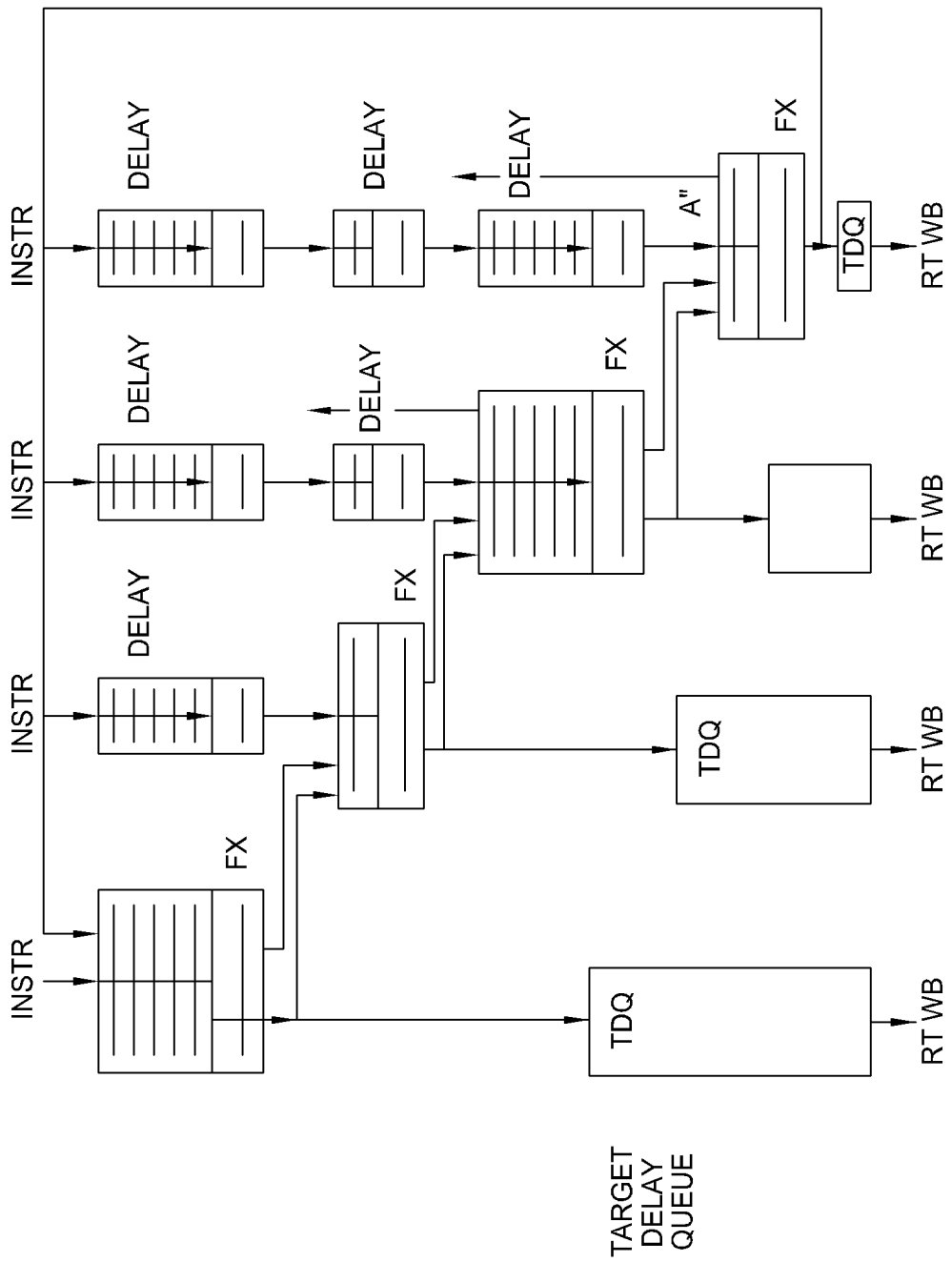

In any case, as illustrated in FIG. 7C, the results of executing the first add (A') may be available as the second load L" reaches the second LSU 612L of the third pipeline (P2). Finally, as illustrated in FIG. 7D, the results of executing the second load (L") may be available as the second add A" reaches the second ALU 612A of the fourth pipeline (P3). Results of executing instructions in the first group may be used as operands in executing the subsequent issue groups and may, therefore, be fed back (e.g., directly or via TDQs 630).

While not illustrated, it should be understood that each clock cycle a new issue groups may enter the pipeline unit 600. In some cases, for example, due to relatively rare instruction streams with multiple dependencies (L'-L"-L'''), each new issue group may not contain a maximum number of instructions (4 in this example), the cascaded delayed arrangement described herein may still provide significant improvements in throughput by allowing dependent instructions to be issued in a common issue group without stalls.

Example Embodiments of Floating Point/Vector Cascaded Delayed Execution Pipelines The concepts of cascaded, delayed, execution pipeline units presented herein, wherein the execution of one more instructions in an issue group is delayed relative to the execution of another instruction in the same group, may be applied in a variety of different configurations utilizing a variety of different types of functional units. Further, for some embodiments, multiple different configurations of cascaded, delayed, execution pipeline units may be included in the same system and/or on the same chip. The particular configuration or set of configurations included with a particular device or system may depend on the intended use.

The fixed point execution pipeline units described above allow issue groups containing relatively simple operations that take only a few cycles to complete, such as load, store, and basic ALU operations to be executed without stalls, despite dependencies within the issue group. However, it is also common to have at least some pipeline units that perform relatively complex operations that may take several cycles, such as floating point multiply/add (MADD) instructions, vector dot products, vector cross products, and the like.

In graphics code, such as that often seen in commercial video games, there tends to be a high frequency of scalar floating point code, for example, when processing 3D scene data to generate pixel values to create a realistic screen image. An example of an instruction stream may include a load (L), immediately followed by a first multiply/add (MADD) based on the load as an input, followed by a second MADD based on the results of the first MADD. In other words, the first MADD depends on the load, while the second MADD depends on the first MADD. The second MADD may be followed by a store to store the results generated by the second MADD.

Figure 8:
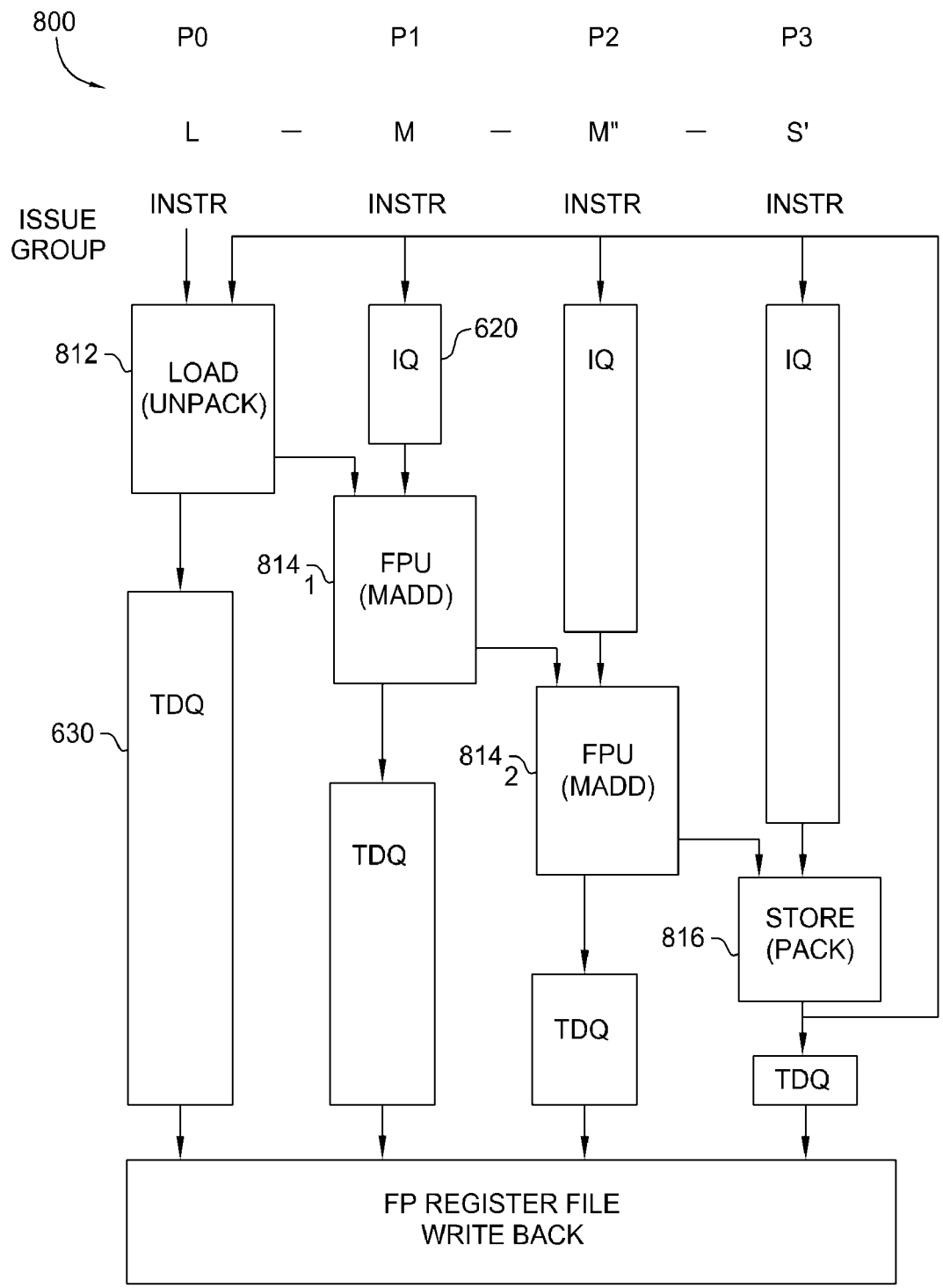
FIG. 8 illustrates an exemplary floating point cascaded delayed execution pipeline unit in accordance with embodiments of the present invention.

FIG. 8 illustrates a cascaded, delayed, execution pipeline unit 800 that would accommodate the example instruction stream described above, allowing the simultaneous issue of two dependent MADD instructions in a single issue group. As illustrated, the unit has four execution units, including a first load store unit (LSU) 812, two floating point units FPUs $814_1$ and $814_2$, and a second LSU 816. The unit 800 allows direct forwarding of the results of the load in the first pipeline (P0) to the first FPU $814_1$ in the second pipeline (P1) and direct forwarding of the results of the first MADD to the second FPU $814_1$.

FIGS. 9A-9D illustrate the flow of an exemplary issue group of four instructions (L'-M'-M'-S') through the pipeline unit 800 shown in FIG. 8 (with M' representing a first dependent multiply/add and M" representing a second multiply/add dependent on the results of the first). As illustrated, in FIG. 9A, the issue group may enter the unit 900, with the load instruction (L') scheduled to the least delayed first pipeline (P0). As a result, L' will reach the first LSU 812 to be executed before the other instructions in the group (these other instructions may make there way down through instruction queues 620) as L' is being executed.

Figure 9A:
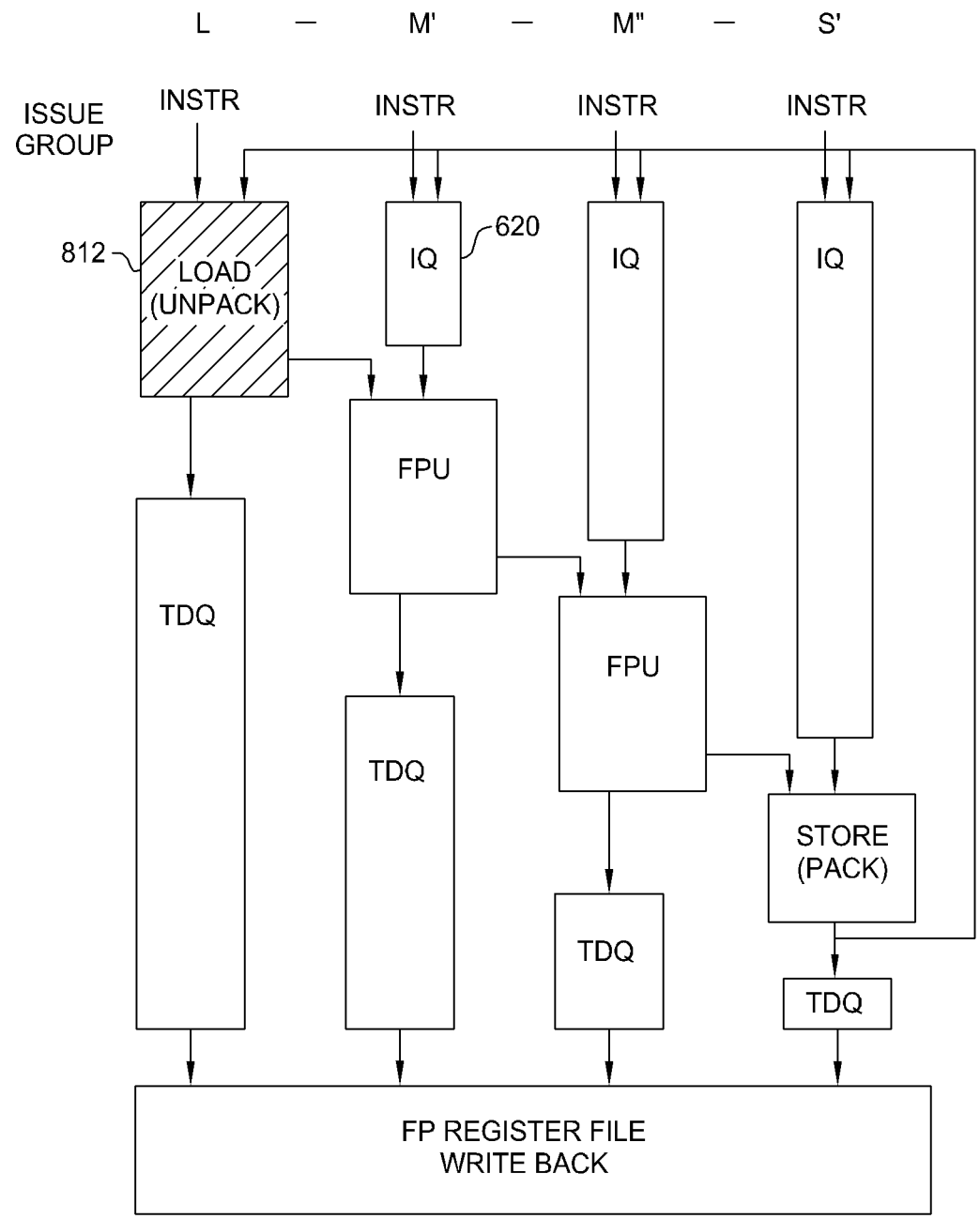
FIGS. 9A-9C illustrate the flow of instructions through the pipeline unit shown in FIG. 5.
Figure 9B:
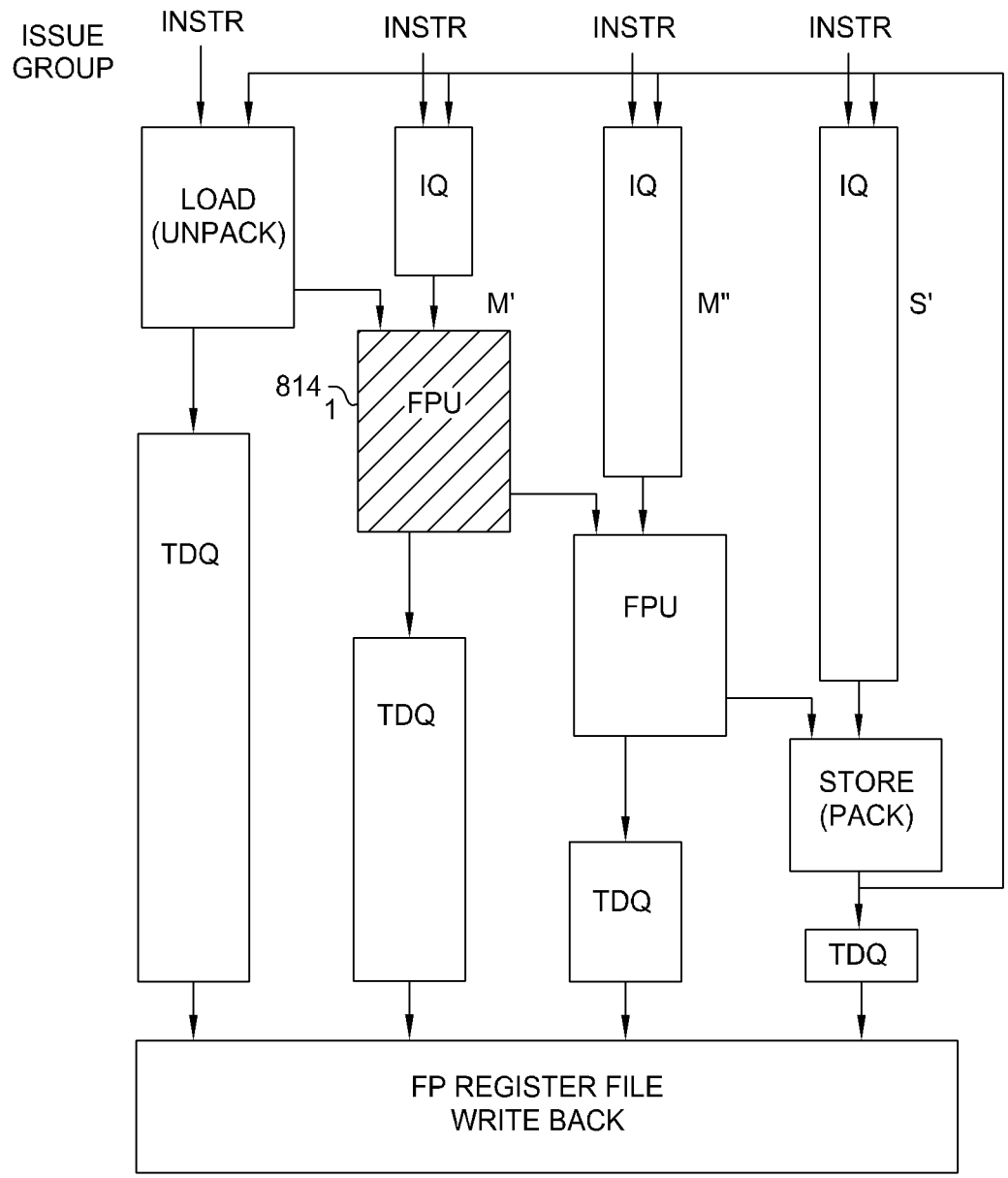
Figure 9C:
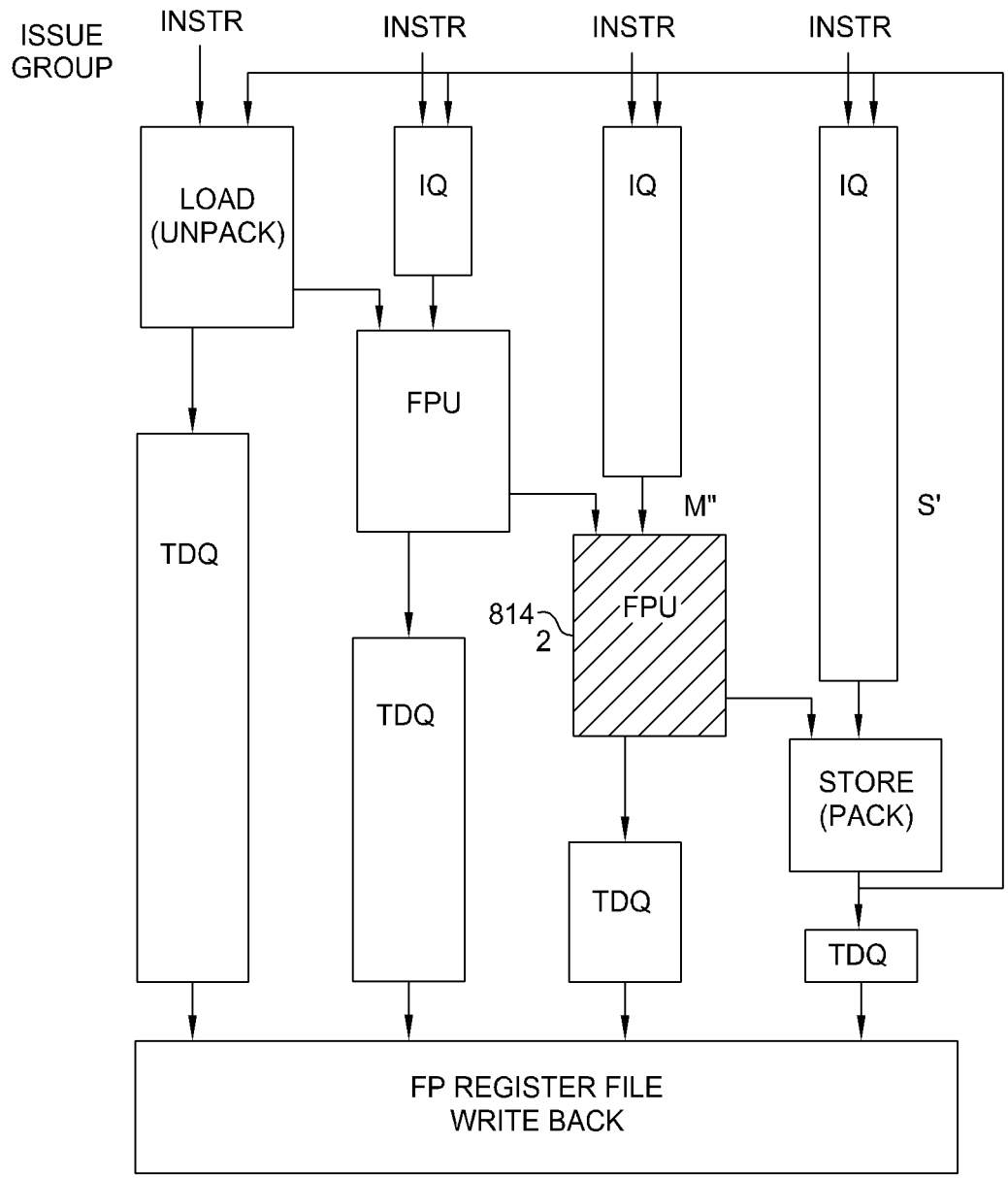
Figure 9D:
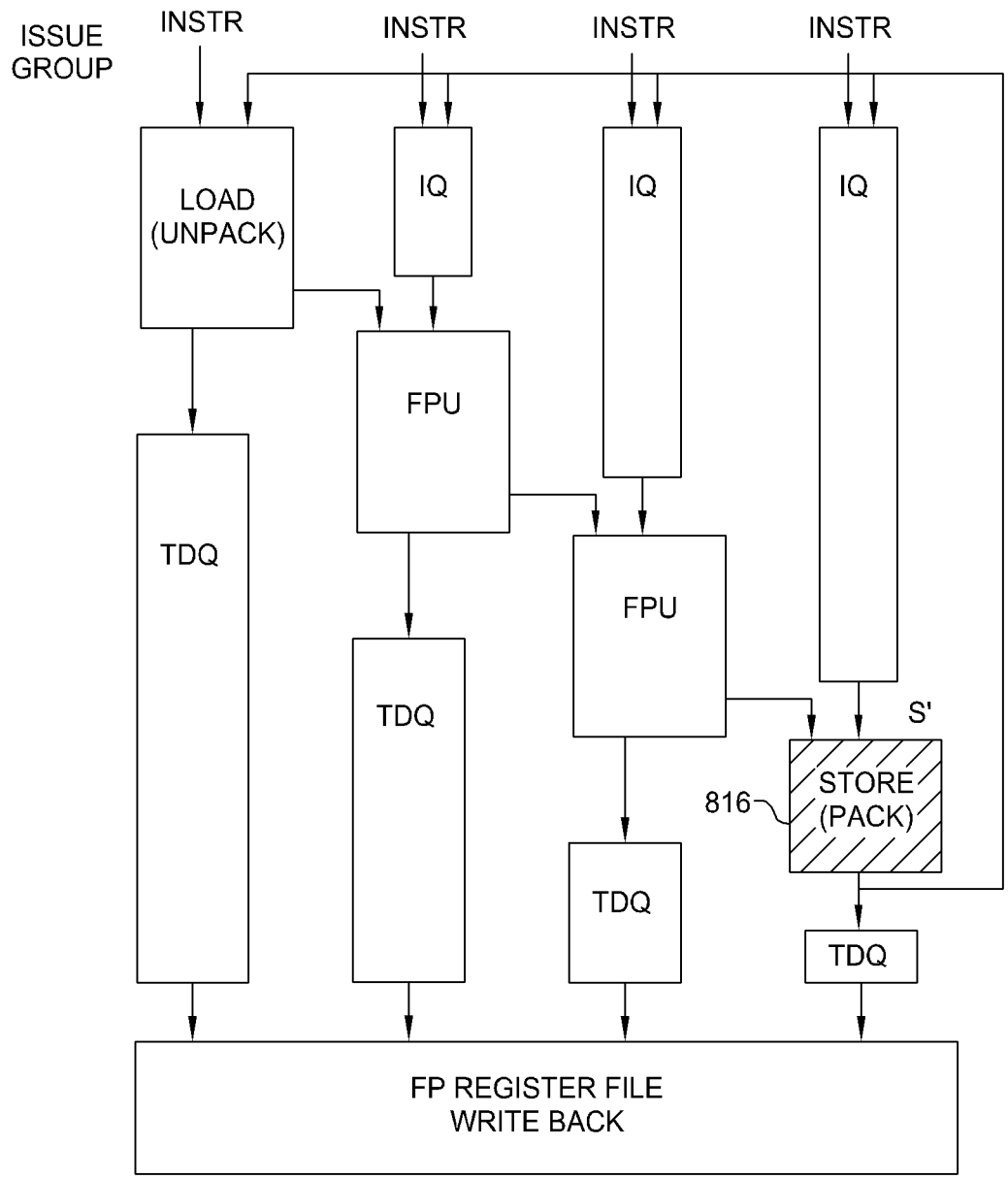

As illustrated in FIG. 9B, the results of executing the first load (L') may be forwarded to the first FPU $814_1$ as the first MADD instruction (M') arrives. As illustrated in FIG. 9C, the results of executing the first MADD (M') may be available just as the second MADD (M") reaches the second FPU $814_2$ of the third pipeline (P2). Finally, as illustrated in FIG. 9D, the results of executing the second MADD (M") may be available as the store instruction (S') reaches the second LSU 812 of the fourth pipeline (P3).

Results of executing instructions in the first group may be used as operands in executing the subsequent issue groups and may, therefore, be fed back (e.g., directly or via TDQs 630), or forwarded to register file write back circuitry. For some embodiments, the (floating point) results of the second MADD instruction may be further processed prior to storage in memory, for example, to compact or compress the results for more efficient storage.

When comparing the floating point cascaded, delayed, execution pipeline unit 800 shown in FIG. 8 with the integer cascaded, delayed, execution pipeline unit 600 shown in FIG. 6, a number of similarities and differences may be observed. For example, each may utilize a number of instruction queues 620 to delay execution of certain instructions issued to "delayed" pipelines, as well as target delay queues 630 to hold "intermediate" target results.

The depth of the FPUs 814 of unit 800 may be significantly greater than the ALUs 600 of unit 600, thereby increasing overall pipeline depth of the unit 800. For some embodiments, this increase in depth may allow some latency, for example, when accessing the L2 cache, to be hidden. As an example, for some embodiments, an L2 access may be initiated early on in pipeline P2 to retrieve one of the operands for the second MADD instruction. The other operand generated by the first MADD instruction may become available just as the L2 access is complete, thus effectively hiding the L2 access latency.

In addition, the forwarding interconnects may be substantially different, in part due to the fact that a load instruction can produce a result that is usable (by another instruction) as an address, a floating point MADD instruction produces a floating point result, which can not be used as an address. Because the FPUs do not produce results that can be used as an address, the pipeline interconnect scheme shown in FIG. 8 may be substantially simpler.

Figure 10:
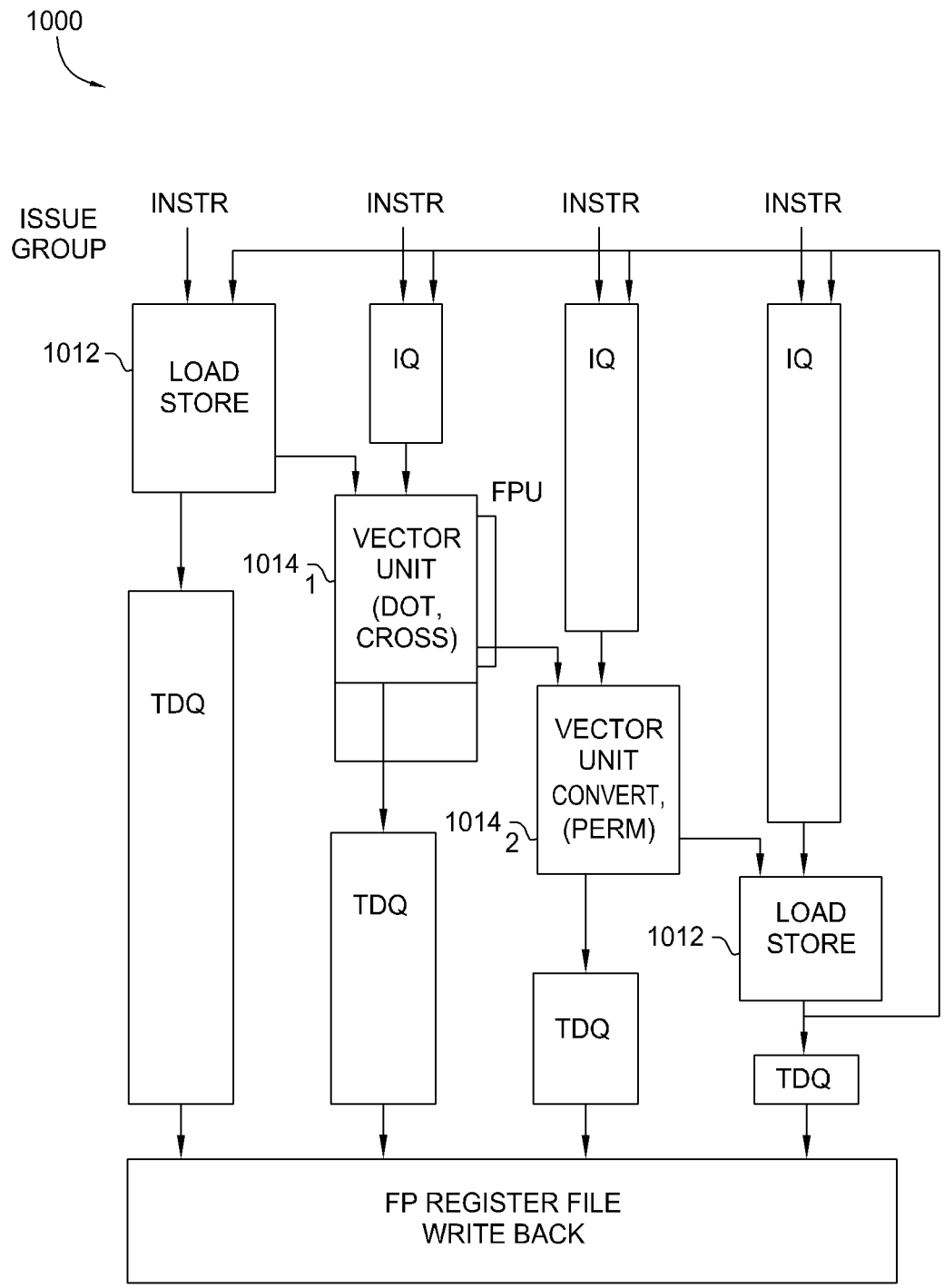
FIG. 10 illustrates an exemplary vector cascaded delayed execution pipeline unit in accordance with embodiments of the present invention.

For some embodiments, various other arrangements of pipeline units may be created for targeted purposes, such as vector processing with permutation instructions (e.g., where intermediate results are used as input to subsequent instructions). FIG. 10 illustrates a cascaded, delayed, execution pipeline unit 1000 that would accommodate such vector operations.

Similar to the execution unit 800 shown in FIG. 8, the execution unit 1000 has four execution units, including first and second load store units (LSUs) 1012, but with two vector processing units FPUs 1014₁ and 1014₂. The vector processing units may be configured to perform various vector processing operations and, in some cases, similar operations to the FPUs 814 in FIG. 8, as well as additional functions.

Examples of such vector operations may involve multiple (e.g., 32-bit or higher) multiply/adds, with the results summed, such as in a dot product or cross product. In some cases, once a dot product is generated, another dot product may be generated therefrom, and/or the result may be compacted in preparation for storage to memory. For some embodiments, a generated dot product may be converted from float to fix, scaled, and compressed, before it is stored to memory or sent elsewhere for additional processing. Such processing may be performed, for example, within a vector processing unit 1014, or in a LSU 1012.

CONCLUSION

By providing a "cascade" of execution pipelines that are delayed relative to each other, a set of dependent instructions in an issue group may be intelligently scheduled to execute in different delayed pipelines such that the entire issue group can execute without stalls.

While the foregoing is directed to embodiments of the present invention, other and further embodiments of the invention may be devised without departing from the basic scope thereof, and the scope thereof is determined by the claims that follow.

What is claimed is:

1. A computer-implemented method of scheduling execution instructions, comprising:

receiving a first issue group comprising a plurality of instructions to be issued in a single cycle to a cascaded delayed execution pipeline unit of a processor core for execution, wherein the plurality of instructions includes at least first and second instructions, wherein at least the second instruction operates on at least one operand generated by the first instruction, wherein the processor core includes a forwarding path, wherein the cascaded delayed execution pipeline unit comprises first, second, third, and fourth execution pipelines, at least three of which each includes an execution unit and further includes an instruction queue or a target delay queue, wherein the instruction queue is configured to hold instructions prior to execution by the execution unit, thereby delaying execution of the held instructions, wherein the target delay queue is configured to hold results obtained from executing instructions by the execution unit, thereby allowing other, delayed instructions to finish execution;

by scheduling circuitry associated with the processor core, scheduling the first instruction for execution in the first execution pipeline and scheduling the second instruction for execution in the second execution pipeline, in which execution is delayed with respect to the first execution pipeline; and issuing the plurality of instructions in a single cycle to the cascaded delayed execution pipeline unit of the processor core for execution, in accordance with the scheduling of the first and second instructions;

wherein the forwarding path of the processor core is configured to forward results generated by executing the first instruction in the first execution pipeline to the second execution pipeline for use in executing the second instruction.

2. The computer-implemented method of claim 1, wherein the first instruction is a floating point instruction that operates on at least one floating point operand generated by at least one other instruction in the issue group.

3. The computer-implemented method of claim 2, further comprising scheduling the other instruction for execution in another pipeline in which execution in first execution pipeline is delayed with respect to the another pipeline.

4. The computer-implemented method of claim 1, wherein the operand generated by executing the first instruction is a floating point operand available at or before the second instruction reaches an execution unit of the second execution pipeline.

5. An integrated circuit device comprising:

a cascaded delayed execution pipeline unit having at least first, second, third, and fourth execution pipelines, at least three of which each includes an execution unit and further includes an instruction queue or a target delay queue, wherein the instruction queue is configured to hold instructions prior to execution by the execution unit, thereby delaying execution of the held instructions, wherein the target delay queue is configured to hold results obtained from executing instructions by the execution unit, thereby allowing other, delayed instructions to finish execution, wherein at least one of the first and second execution pipelines operates on an operand;

scheduling circuitry configured to: (i) receive instructions of a common issue group, wherein the instructions include at least first and second instructions; (ii) determine if the second instruction of the common issue group is dependent on results generated by executing the first instruction of the common issue group; and (iii) if so, schedule the first instruction for execution in the first execution pipeline and schedule the second instruction for execution in the second execution pipeline, in which execution is delayed with respect to the first execution pipeline, wherein the instructions in the common issue group are issued in a single cycle to the cascaded delayed execution pipeline unit and in accordance with the scheduling of the first and second instructions; and a forwarding path for forwarding results generated by executing the first instruction in the first execution pipeline to the second execution pipeline for use in executing the second instruction.

6. The integrated circuit device of claim 5, wherein results of executing the first instruction in the common issue group in the first execution pipeline are available at or before the second instruction in the common issue group reaches an execution unit of the second execution pipeline.

7. An integrated circuit device comprising:

a cascaded delayed execution pipeline unit having at least first, second, third, and fourth execution pipelines, at least three of which each includes an execution unit and further includes an instruction queue or a target delay queue, wherein the instruction queue is configured to hold instructions prior to execution by the execution unit, thereby delaying execution of the held instructions, wherein the target delay queue is configured to hold results obtained from executing instructions by the execution unit, thereby allowing other, delayed instructions to finish execution;

a forwarding path for forwarding results generated by executing a first instruction in the first execution pipeline to the second execution pipeline for use in executing a second instruction, wherein at least one of the first and second execution pipelines operates on an operand; and scheduling circuitry configured to receive a first issue group of instructions including at least first and second instructions, determine if the second instruction in the issue group is dependent on results generated by executing the first instruction and, if so, schedule the first instruction for execution in the first execution pipeline and schedule the second instruction for execution in the second execution pipeline, in which execution is delayed with respect to the first execution pipeline, wherein the instructions in the first issue group are issued in a single cycle to the cascaded delayed execution pipeline unit and in accordance with the scheduling of the first and second instructions.

8. The integrated circuit device of claim 7, wherein the scheduling circuitry determines if the second instruction is dependent on the first instruction by examining source and target operands of the first and second instructions.

9. The integrated circuit device of claim 7, wherein results of executing the first instruction are available at or before the second instruction reaches an execution unit of the second execution pipeline.

10. The computer-implemented method of claim 1, wherein the processor core is of a computer processor that includes at least three processor cores including the processor core, each processor core associated with a respective, Level 1 (L1) cache, wherein the scheduling circuitry is included in a shared predecoder and scheduler component shared among the at least three processor cores and associated L1 caches.

11. The computer-implemented method of claim 10, wherein the cascaded delayed execution pipeline unit further comprises at least one pipeline in which execution is not delayed with respective to at least one other pipeline in the cascaded delayed execution pipeline, wherein execution in the at least one other pipeline is not delayed with respect to the at least one pipeline.

12. The computer-implemented method of claim 11, wherein each L1 cache includes an instruction cache (I-cache), an I-cache directory, a data cache (D-cache), and a D-cache directory, wherein the computer processor further includes:
(i) a shared Level 2 (L2) cache shared among the at least three processor cores, wherein the predecoder and scheduler component is operatively connected to the shared L2 cache and each L1 cache;
(ii) L2 cache access circuitry operatively connected to the shared L2 cache;
(iii) an instruction line (I-line) buffer operatively connected to the L1 cache of the processor core; and
(iv) issue and dispatch circuitry operatively connected to the I-line buffer and the processor core, wherein the issue and dispatch circuitry includes circuitry to rotate and merge the plurality of instructions based on one or more dependencies therebetween and in order to form the first instruction group.

13. The computer-implemented method of claim 12, wherein the computer processor further includes:
(v) write-back circuitry operatively connected to the processor core;
(vi) instruction fetching circuitry operatively connected to the write-back circuitry and to the issue and dispatch circuitry;
(vii) cache load and store circuitry operatively connected to the processor core and to the D-cache of the L1 cache of the processor core, which is in turn operatively connected to the shared L2 cache; and
(viii) a register file operatively connected to the processor core and to the write-back circuitry.

14. The computer-implemented method of claim 13, wherein the second execution pipeline includes more instruction queues and fewer target delay queues than the first execution pipeline, wherein the third execution pipeline includes more instruction queues and fewer target delay queues than the second execution pipeline, wherein the fourth execution pipeline includes more instruction queues and fewer target delay queues than the third execution pipeline, wherein cascaded, delayed execution of instructions is provided by arrangement of the instruction queues and target delay queues within the cascaded delayed execution pipeline unit, thereby permitting the first issue group to issue in the single cycle and despite the one or more dependencies therebetween.

15. The computer-implemented method of claim 14, wherein the execution units of the first and fourth execution pipelines are load and store units, wherein the execution units of the second and third execution pipelines are floating point units, wherein in a given instance, at least one instruction in the instruction delay queue and at least one result in the target delay queue are invalidated, wherein the plurality of instructions form part of a program.

16. The computer-implemented method of claim 15, wherein the arrangement of the instruction queues and target delay queues within the cascaded delayed execution pipeline unit has an associated depth and facilitates reducing incidence of pipeline stalls, thereby reducing a total count of issue cycles of the program and without any issue width increase, wherein the total count of issue cycles of the program is reduced at least relative to an execution pipeline unit not configured in any cascaded delayed manner, wherein the processor core is configured to issue, in consecutive cycles, a respective one of a plurality of issue groups, wherein the plurality of issue groups includes the first issue group, a second issue group, and a third issue group, wherein one or more results obtained from executing the first issue group are used as one or more operands in executing the second issue group.

17. The computer-implemented method of claim 16, wherein the first instruction, the second instruction, and a third instruction are in program order, wherein the third instruction is issued in a second issue group subsequent to the first issue group, wherein the third instruction is issued out-of-order relative to at least one other instruction, wherein the shared predecoder and scheduler component is configured to apply a predefined set of scheduling rules by examining a window of instructions to issue to check for dependencies and generate a set of issue flags that control how the issue and dispatch circuitry is to issue instructions within a given issue group, wherein the write-back circuitry is configured to write back a most recently modified register value received from the target delay queue, wherein the cascaded delayed execution pipeline unit is configured to support a maximum dependent instruction chain size based on the depth of the cascaded delayed execution pipeline unit.

18. The computer-implemented method of claim 17, wherein the scheduling circuitry determines if the second instruction is dependent on the first instruction by examining source and target operands of the first and second instructions, wherein the processor is of a system that includes system memory, a graphics processing unit, an input/output (I/O) interface, and a storage device, wherein any delay arising from the second issue group awaiting one or more results of the first issue group is effectively hidden via the arrangement, wherein the shared L2 cache has an access latency, wherein the access latency is effectively hidden via the arrangement, wherein the first instruction is a floating point instruction that operates on at least one floating point operand generated by at least one other instruction in the issue group.

19. The computer-implemented method of claim 18, wherein the scheduling of the first instruction is performed during a predecoding stage, wherein in a first instance, the first and second instructions are floating point instructions that each multiply two floating point operands, wherein in a second instance, each of the first and second instructions computes a dot product, wherein in a third instance, each of the first and second instructions involves permutation, wherein the operand generated by executing the first instruction comprises a floating point operand that is, in respective instances: (i) available when the second instruction reaches the execution unit of the second execution pipeline; and (ii) available before the second instruction reaches the execution unit of the second execution pipeline; wherein the method further comprises scheduling the other instruction for execution in another pipeline in which execution in first execution pipeline is delayed with respect to the another pipeline.

20. The integrated circuit device of claim 5, wherein the scheduling circuitry determines if the second instruction is dependent on the first instruction by examining source and target operands of the first and second instructions.

* * * * *